(12) United States Patent
Hughes et al.

(10) Patent No.: US 7,897,121 B1
(45) Date of Patent: Mar. 1, 2011

(54) HUGHES MOLECULAR MIXER AND CATALYTIC REACTOR

(75) Inventors: Nathaniel Hughes, Palm Springs, CA (US); Leon Shaw, Santa Monica, CA (US)

(73) Assignee: Fluid Energy Conversion, Inc., Palm Springs, CA (US)

( * ) Notice: Subject to any disclaimer, the term of this patent is extended or adjusted under 35 U.S.C. 154(b) by 272 days.

(21) Appl. No.: 12/188,147

(22) Filed: Aug. 7, 2008

Related U.S. Application Data

(60) Provisional application No. 60/963,752, filed on Aug. 7, 2007.

(51) Int. Cl.
- *B01J 19/00* (2006.01)
- *B01J 8/02* (2006.01)
- *B01F 5/06* (2006.01)

(52) U.S. Cl. .................. 422/224; 422/211; 422/220; 422/222; 422/312; 366/338; 366/340; 366/341

(58) Field of Classification Search .................. 422/211, 422/220, 222, 224, 312; 366/338, 340, 341
See application file for complete search history.

(56) References Cited

U.S. PATENT DOCUMENTS

| | | | | |
|---|---|---|---|---|
| 2,709,128 A * | 5/1955 | Krause | ............ | 422/310 |
| 4,189,101 A | 2/1980 | Hughes | ............ | 239/405 |
| 4,190,203 A | 2/1980 | Hughes | ............ | 239/102 |
| 4,192,465 A | 3/1980 | Hughes | ............ | 239/405 |
| 4,240,293 A | 12/1980 | Hughes | ............ | 73/861.22 |
| 4,241,877 A | 12/1980 | Hughes | ............ | 239/405 |
| 4,372,169 A | 2/1983 | Hughes | ............ | 73/861.52 |
| 4,453,542 A | 6/1984 | Hughes | ............ | 128/200.21 |
| 4,730,500 A | 3/1988 | Hughes | ............ | 73/861.22 |
| 4,896,541 A | 1/1990 | Hughes | ............ | 73/861.22 |
| 5,176,448 A * | 1/1993 | King et al. | ............ | 366/174.1 |
| 6,058,787 A | 5/2000 | Hughes | ............ | 73/861.63 |
| 6,158,676 A | 12/2000 | Hughes | ............ | 239/405 |
| 6,865,957 B1 | 3/2005 | Hughes et al. | ............ | 73/861.52 |
| 6,984,365 B2 | 1/2006 | Nelson et al. | ............ | 422/224 |
| 7,165,881 B2 | 1/2007 | Holl | ............ | 366/341 |
| 7,404,337 B2 | 7/2008 | Hughes et al. | ............ | 73/861.52 |
| 2004/0187866 A1 | 9/2004 | Hughes et al. | ............ | 128/203.12 |
| 2006/0042399 A1 | 3/2006 | Hughes et al. | ............ | 73/861.52 |
| 2007/0157738 A1 | 7/2007 | Hughes et al. | ............ | 73/861.52 |

* cited by examiner

*Primary Examiner*—Walter D Griffin
*Assistant Examiner*—Lessanework Seifu
(74) *Attorney, Agent, or Firm*—Sanford Astor; Lewis Brisbois Bisgaard Smith LLP

(57) ABSTRACT

A fluid reactor for facilitating mixing and/or chemical reaction and including an elongated cylindrical flow chamber having a first for receiving a flow of a first fluid, a second flow inlet through which a relatively low mass flow of a second fluid may be admitted to the chamber; and a cone-pi element disposed downstream of the second flow inlet and having an upstream conical portion with a leading apex generally facing the first flow inlet, an intervening cylindrical portion, and a downstream conical portion with a trailing apex generally facing the flow outlet, the cone-pi element being operable to produce cavitation and/or vortical flow within the flow stream to effectuate mixing and/or chemical interaction of the first fluid and the second fluid, and to deliver a mixed and/or reacted fluid from the flow outlet. The reactor may also include a catalytic component disposed within the chamber between the cone-pi element and the flow outlet for further influencing the interaction between the first fluid and the second fluid prior to its exit through the flow outlet.

19 Claims, 4 Drawing Sheets

HUGHES MOLECULAR MIXER AND CATALYTIC REACTOR

CROSS-REFERENCE TO RELATED APPLICATIONS

This application claims priority from my previously-filed U.S. Provisional Application No. 60/963,752, filed on Aug. 7, 2007, which application is incorporated herein by reference in its entirety.

FIELD

The present disclosure relates generally to the art of reactor engineering, and more particularly relates to improved apparatuses and methods for mass transfer and chemical reaction.

BACKGROUND

Efficient mass transfer is important to effectuate exchange of substances for chemical reactions, dialysis, and other chemical engineering processes. For example, there are hemodialysis systems depending on mass transport of metabolic products and/or ions across a membrane between blood and a dialysis fluid. These systems can remove toxic products from the blood and/or effectuate an ionic balance in the blood. Mass transfer within a fluid, and at boundaries of a fluid can be enhanced by energy and flow fields in the fluid. For example, input mechanical energy stirring a fluid, energy of flow in vortices, turbulence in a flow, or thermal energy, in single or in combination, can effectuate mass transfer and/or mixing.

Although the terms mixing and mass transfer are sometimes used synonymously, mass transfer as used herein refers to a flux of material from one spatial location to another, whereas mixing references the reduction of compositional differences through mass transfer. Mass transfer and mixing are often synergistic. For example, transfer of material into flowing fluid from a boundary, and/or transfer of material from a flowing fluid to a boundary, can be increased by mixing fluid near the boundary with different fluid in flow regions away from the boundary. Because the fluid in contact with a solid boundary has no tangential velocity (e.g. zero velocity boundary condition), transferring the material out of slow moving fluid near a boundary (e.g. in a boundary layer) can increase mass transfer rate.

Mass transport in the bulk of a fluid and/or mass transfer in a boundary layer can be enhanced by adding and/or transforming energy. For example, fluid can be mixed by introducing kinetic energy that moves one portion of fluid relative to another portion. In some apparatus, mixing has been induced using a source of external energy to driving a moving impeller. There is apparatus where kinetic and pressure energy of a flowing fluid is mixed using a static impeller (mixer) configuration. Energy effective for mixing can also be obtained through transformation of a relatively constant fluid motion into vortices, turbulence, and the like. For example, vortices can be formed in a sudden change in the cross section of a flow (e.g. at a boundary and/or surface discontinuity). When vortices are formed in this manner, energy from upstream fluid flow is transformed into energy for the vortex motion. Turbulence can also be generated with a sudden change in flow cross section. Where there is turbulence, pressure and/or kinetic energy of translational fluid motion is converted into chaotic flow and eddy currents. Turbulent flow can enhance mass transfer and mixing.

Energy in a flowing fluid can also be transformed into heat, sound, and/or electromagnetic radiation. Chaotic flows comprising vortices eddies, as well as collapsing gas bubbles, in a flow have been and are particularly favorable environments to effectuate such transformation. Furthermore, it has been found that various forms of energy release in a fluid can induce and/or enhance chemical reactions. For example, it has been found that acoustic energy, shock waves, and/or electromagnetic radiation in a fluid can stimulate chemical reactions. These and other forms of energy can be released in a flow comprising of vortices, turbulence, bubbles, and/or other forms of chaotic flow motion.

Chemical reaction in a fluid can be useful for destruction of dissolved toxins such as toxic compounds extracted in the dialysis of blood using a membrane. There are numerous other applications depending on chemical reaction in a fluid. For example, it has been found that chemical reactions of dissolved calcium compounds occurring on the surface of copper-containing alloys, are effective to improve water use efficiency for irrigation.

It can thereby be seen that there has been a long felt need for apparatus and methods to improve mixing and/or to induce chemical reactions in a fluid flow.

SUMMARY

A fluid reactor for facilitating mixing and/or chemical reaction comprising means forming an elongated cylindrical flow chamber having a first flow inlet at one end, and a flow outlet at another end, the first flow inlet being operable to admit a flow of a first fluid into the flow chamber, a second flow inlet through a wall of the flow chamber at a position downstream of the first flow inlet, the second flow inlet being operable to admit a relatively low mass flow of a second fluid into the flow chamber; and a cone-pi element disposed in a position downstream of the second flow inlet and having an upstream conical portion with a leading apex generally facing the first flow inlet, an intervening cylindrical portion, and a downstream conical portion with a trailing apex generally facing the flow outlet, the cone-pi element being attached to a wall of the flow chamber by at least one strut, the cone-pi element being operable to produce cavitation and/or vortical flow within the flow stream to effectuate mixing and/or chemical interaction of the first fluid and the second fluid, and to deliver a mixed and/or reacted fluid from the flow outlet.

The reactor may also include a catalytic component disposed within the chamber between the cone-pi element and the flow outlet for further influencing the interaction between the first fluid and the second fluid prior to its exit through the flow outlet.

BRIEF DESCRIPTION OF DRAWINGS

Various features and embodiments are illustrated in an exemplary manner by the accompanying drawings The drawings and accompanying description should be understood to explain principles of the embodiments rather than being limiting. Other embodiments will become apparent from the description and the following drawings.

DETAILED DESCRIPTION

Figure 1:
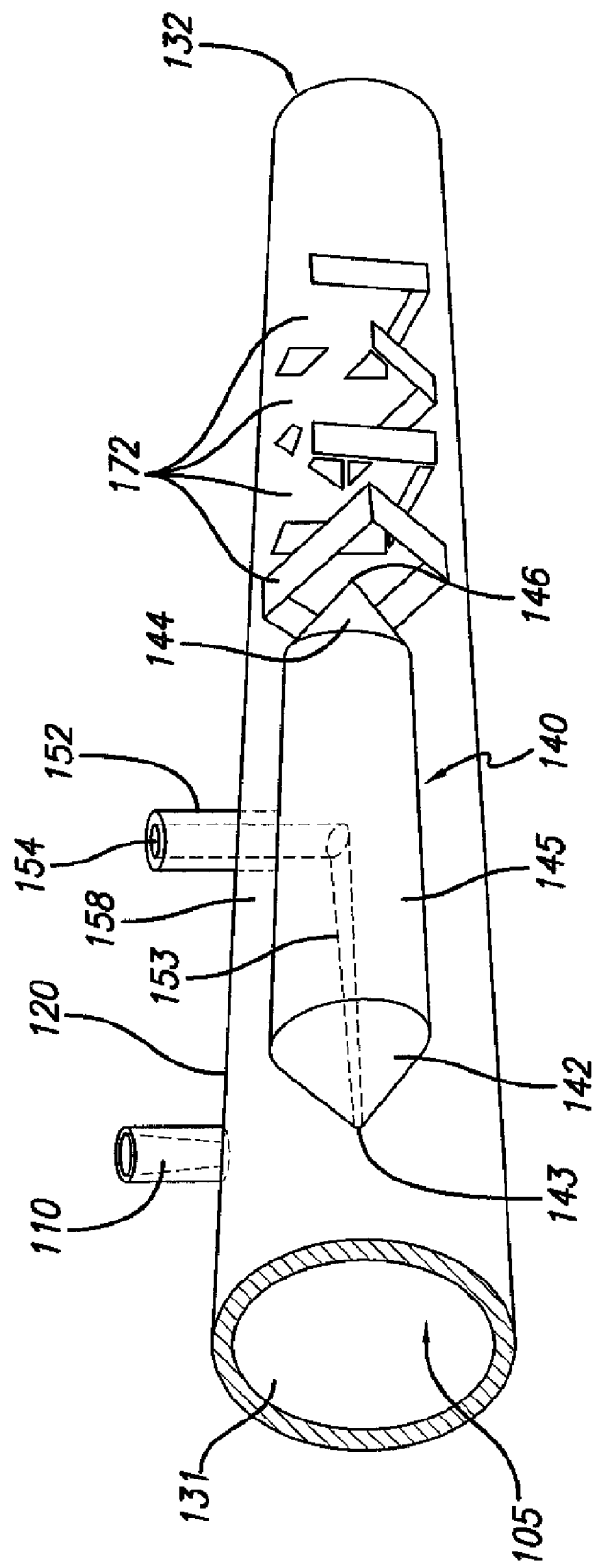
FIG. 1 is a perspective schematic view showing aspects of a fluid energy reactor in accordance with the present invention for inducing mixing and/or chemical reactions in a fluid flow.

Apparatus and methods to induce mixing and/or chemical reaction in a fluid are disclosed. Various embodiments provide an elongated flow chamber 105 having a coaxial flow directing body 140 therein as shown with respect to FIG. 1. The flow directing body 140, known as a "cone-pi" element, comprises an upstream conical portion 142 facing against the direction of a bulk liquid flow inlet 131, an intervening cylindrical portion 145, and a downstream conical portion 144 facing in the direction of bulk liquid flow from the inlet 131 to the outlet 132. The cone-pi element 140 can be supported from the wall of the chamber using one or more struts 152. Some embodiments have a fluid passage 110 for admitting a relatively small flow of gas or liquid into the bulk liquid flow upstream of the cone-pi element. This reactor configuration is operable to effectuate a highly uniform dispersal of the fluid admitted at 110, and in the case of a gas may result a relatively uniform size distribution of minute bubbles in a highly energetic swirling vortex flow field. Various forms of energy are released from the fluid flow field and cavitation of minute bubbles in the stable vortex flow. The vortex flow and energy release is operable to effectuate rapid mass transport and rapid chemical reaction.

In a number of embodiments, one or more struts 152 supporting the cone-pi element 140 comprise a small fluid channel 154 in fluidic communication with the apex or other part of conical surface 142 via a passage 153. The fluid channels can be used to introduce a flow of liquid material into the reactor for rapid mixing into the bulk liquid flow and/or chemical reaction. The terminology used herein is for the purpose of describing particular embodiments and is not intended to limit the scope of the claims. It will be understood that, although the terms first, second, etc. may be used to describe various elements, these terms are only used to distinguish one element from another and the elements should not be limited by these terms. For example, a first element could be termed a second element, and similarly a second element could be termed a first element, without departing from the scope of the instant description. It will also be understood that the terms left, right, top, bottom, front, back, upward, downward, etc. are used to distinguish elements so referenced and are not intended to be limiting or to preclude or require a particular orientation of the inductive applicator. For example, by reversing the orientation of an article or an observer's frame of reference, a left element can be termed a right element, a right element termed a left element, a front element can be termed a back element, a back element can be termed front element, a top element termed a bottom element, and a bottom element termed a top element.

As used herein, the singular forms "a", "an" and "the" are intended to include the plural forms as well, unless the context clearly indicates otherwise. It will be further understood that the terms "comprises," "comprising," "includes," "including," "have" and/or "having," as used herein, are open-ended terms of art that signify the presence of stated features, integers, steps, operations, elements, and/or components, but do not preclude the presence or addition of one or more other features, integers, steps, operations, elements, components, and/or groups thereof. Reference in the specification to "one embodiment", "an embodiment", or some embodiment, etc. means that a particular feature, structure, or characteristic described in connection with the embodiment is included in at least one embodiment. The appearances of the phrase "in one embodiment" in various places in the specification are not necessarily all referring to the same embodiment, nor are separate or alternative embodiments mutually exclusive of other embodiments. The phrase "scope of the claims" as used herein references the scope of all claims taken together collectively, rather than the scope of any particular claim.

The present teachings may be embodied in various different forms. In the following description, for purposes of explanation, numerous specific details are set forth in the description and drawings in order to provide a thorough understanding of the various principles. Furthermore, in various instances, structures and devices are described and/or drawn in simplified form in order to avoid obscuring the concepts. However, it will be apparent to one skilled in the art that the principles can be practiced in various different forms without these specific details. Hence aspects of the claims should not be construed as being limited to the embodiments set forth herein, except were explicitly recited therein.

In various embodiments with respect to FIG. 1, an apparatus in accordance with the present invention may comprise an elongated flow chamber 105 operable to confine a flow of liquid from the inlet 131 to the outlet 132. A gas or other fluid material can be injected into the chamber 105 through a tubulation 110. The chamber includes an upstream entrance opening 131 for admitting a bulk fluid, and a downstream exit opening 132 for delivering fluid from the chamber. In some embodiments, the interior cross section of the chamber is cylindrical. However, it could be of various other tubular configurations. There is a flow directing body 140 that can be approximately centered within the chamber. The body 140 includes an upstream conical portion 142 having an apex facing against the direction of flow from the entrance opening 131, and a downstream conical portion 144 having an apex 146 facing in the direction of flow towards the exit. The body 140 has a cylindrical portion 145 between cones 142 and 144.

The body can be supported within the chamber in a generally fixed manner by one or more supporting struts or pylons such as strut 152. The interior of the cone-pi element can be solid or a portion may be hollow. In some embodiments one or more of the struts 152 comprise one or more fluid channels 154 in fluidic communication with a passage 153 connecting through the cone-pi element body to apex 143. A small mass flow rate of an additional fluid (e.g., a liquid, a gas, an emulsion, or a slurry of microscopic particles) stream can be introduced into the reactor through the fluid passage and/or passages 153 in the strut(s). The flow chamber, cone-pi element and struts can be constructed from materials that are physically and chemically compatible with the flows of bulk fluid, injected gas, and added fluid streams, if any.

Figure 2:
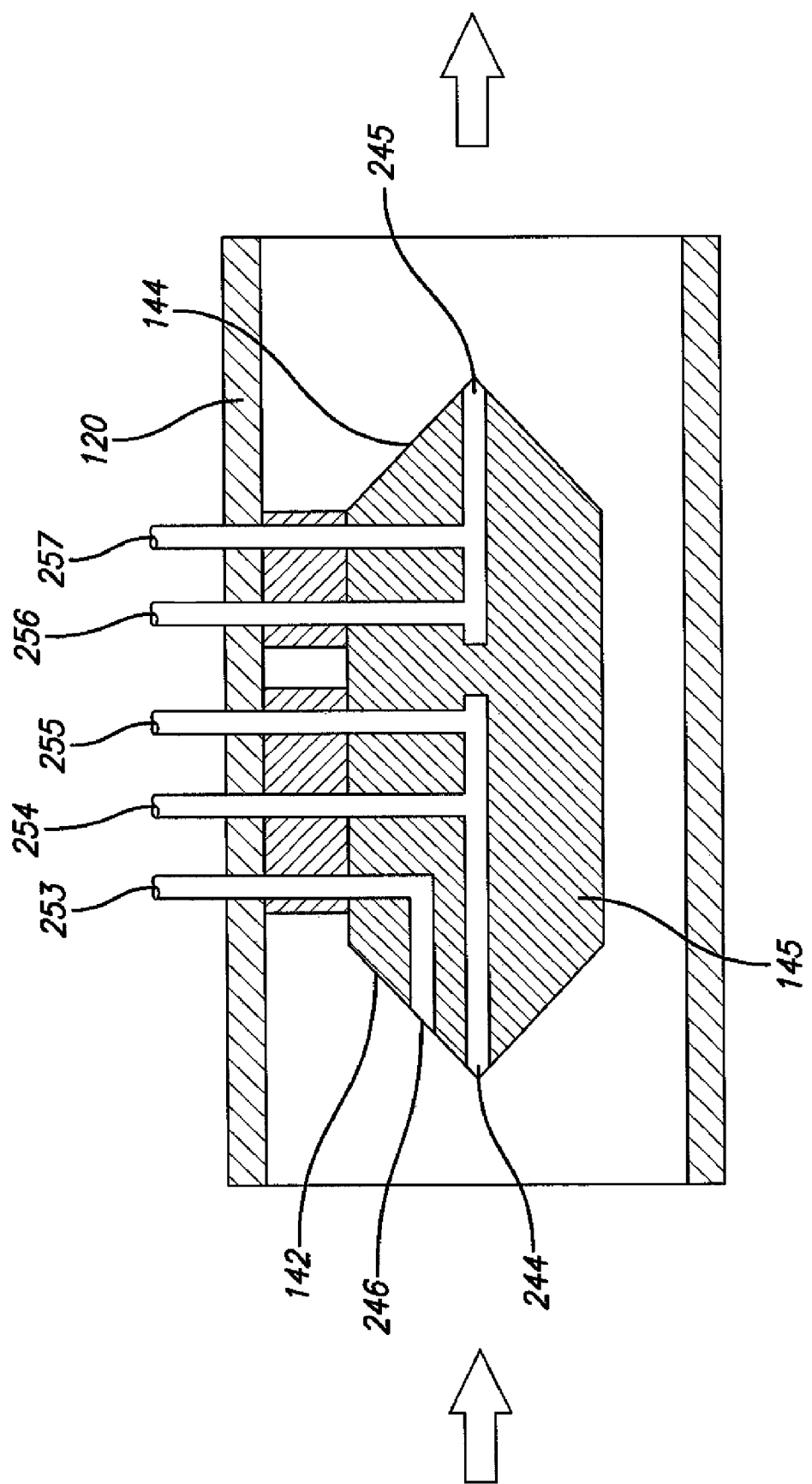
FIG. 2 is a schematic showing a portion of a fluid energy reactor embodiment in accordance with the present invention having a plurality of fluid passage means.

The embodiment shown with respect to FIG. 1 has one inlet fluid channel means 154. However in other embodiments such as embodiments with respect to FIG. 2, there can be a plurality of fluid channel passage means such as 253, 254, 255, 256, and/or 257. The fluid channel passage means can be in one or more pylons or struts that can provide mechanical support for the cone-pi element. Each of the fluid channel inlet means is operable to feed a fluid into the reactor from one or more apertures such as 244 and/or 246 on the upstream cone 142, and/or from aperture 245 on downstream cone 144. An aperture can be positioned to emit fluid at an apex such as aperture 244, and/or can be in a different position such as aperture 246. In one embodiment, there is only one aperture 244 at the apex of the upstream cone. Alternatively, there are embodiments having a plurality of fluid passages through pylons wherein one or more of the fluid passages can be selectively throttled using flow control means such as a valve (not shown) or blocked using means such as a cap or plug. There are also embodiments having no inlet means or fluid passage in any strut or pylon. The cone-pi body may take various sizes commensurate with the size of the chamber and the flow conditions of the fluid intended to pass through the chamber.

When bulk fluid moves over the leading upstream cone, it is accelerated and compressed as it enters the annular passage 158 (FIG. 1) between the cone-pi element and the inner cylindrical wall of the flow chamber. It has been found that this configuration produces a flow field of spinning ultra-miniature stable vortices. When relatively low mass flow rates of fluid in the form of a gas are injected through gas inlet 110, the gas is dispersed and forms a swirling agitated flow of uniform minute bubbles dispersed throughout the flowing liquid in the chamber. It has been observed that ultrasound is emitted as the myriad chaotic bubbles swirl in the flow and collapse and/or cavitate on surfaces. It has been found that chaotic bubbles, vortices, ultrasound, and other energy release in this flow are highly effective to mix the fluid, and enhance mass transfer to surfaces at boundaries of the flow. For example, mass transfer of diasylate material from a separating membrane in an aqueous effluent of a reactor of the present invention is substantially faster than that obtained using laminar or turbulent flow at the same average fluid velocity.

Although the usefulness of various embodiments is not believed to depend on any specific theory, it is believed that the sources of energy powering mixing by the swirling vortices, ultrasound, and cavitation are the dynamic pressure and momentum of the fluid flow, and internal energy release by changing pressure and temperature of the moving fluid. The dynamic pressure and momentum of the flow are believed to be proportional to the product of fluid density and the square of the flow velocity. The energy release by bubble cavitation and motion is found to be induced and/or controlled by the injection of gas upstream of the cone-pi element through inlet 110.

Various reactor embodiments with respect to FIG. 1, comprise one or more catalytic bands 172 downstream of the cone-pi element. It has been found that the catalytic bands 172 are operable to effectuate chemical reactions of species in the bulk liquid flow and/or species in fluid admitted through inlet 110. In one embodiment, the bands comprise a substrate that is coated with a catalytic surface layer consisting essentially of a copper alloy or the like. Generally, the composition of the substrate is not critical. Depending on the application, the substrate can be a relatively stiff metal (such as brass, aluminum, iron, steel, etc.), a non-metallic material such as a plastic, and/or a composite material.

In some embodiments of the present invention, each band has the form of an open or closed ribbon in the shape of a square. In such embodiments, the bands are held in place by a force between the ribbon corners pressing against the inside wall of the flow chamber (e.g. during assembly, the bands or rings are compressed for insertion into the flow chamber and, in position, allowed to "spring-back" against the inside wall). In further embodiments catalytic rings can be made in the form of rectangular, triangular, and other loop shapes. However square and/or triangular ribbon loops have particularly suitable mechanical properties (maintaining position through spring-back frictional contact) and allow sufficient flow through the channels between the ribbons and flow chamber wall to obtain high utilization of all surfaces including the outermost catalytic surface area.

Figure 3:
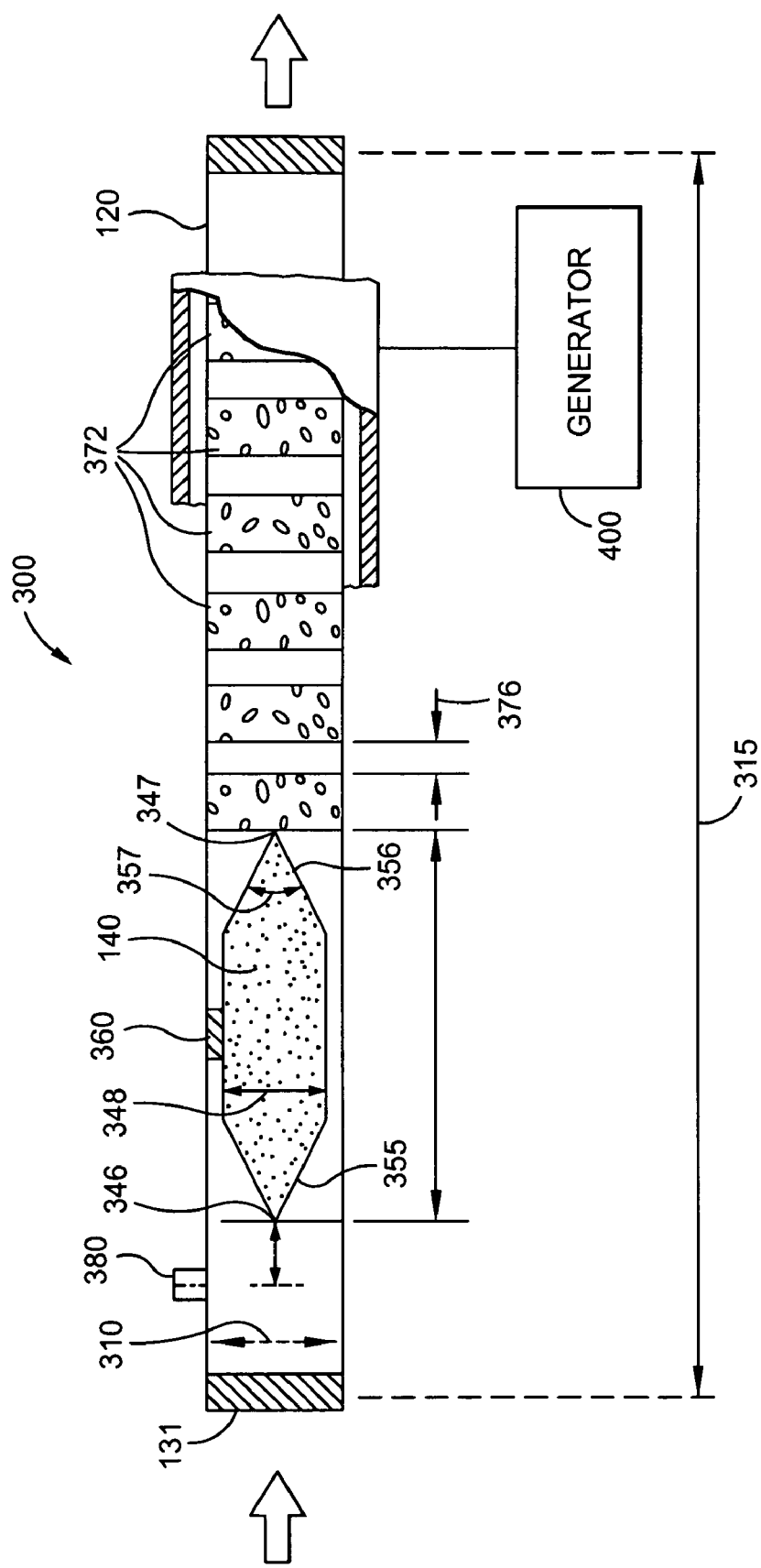
FIG. 3 is a simplified cross sectional view of an embodiment.

In some embodiments such as that illustrated in FIG. 3, a cylindrical flow chamber 120 has an inside diameter 310 of approximately 1-inch and a length 315 of approximately 7 inches. In some of these embodiments the cone-pi element 140 is positioned such that the apex of the leading cone 346 (upstream cone) is about 1.4 inches downstream of the bulk fluid inlet 131. The cone-pi element 140 is comprised of a 1.6 inch long central cylindrical central portion having a ¾ inch outside diameter 348, and conical ends 355, 356 each having a 45 degree apex angle 357 and an axial height of approximately 1 inch (upstream cone 355 and downstream cone 356 protrude approximately 1 inch from upstream and downstream ends of the cylindrical center portion of the cone-pi element).

In some of these embodiments there are a number of catalytic bands 372 positioned downstream of the cone-pi element. In an embodiment with respect to FIG. 3 there are 6 square ribbon catalytic bands 372, each band extending in width approximately 0.43 inches along the flow cylinder axis, and positioned so as to have a gap 376 of ¼ inch between leading and/or trailing edges of neighboring bands. The leading edge of the upstream-most catalytic band is approximately at the axial position of the downstream cone-pi apex 347. Some embodiments have no catalytic bands 372, and there are other embodiments having various different numbers of catalytic bands, depending on the application. Furthermore, the catalytic bands in a reactor can have various widths, shapes (closed ribbons in the form of squares, rectangles, triangles, hexagons, and others) and/or combinations thereof, and/or be deployed in various predetermined positions and/or orientations.

An embodiment with respect to FIG. 3 has a fluid inlet 380 for introducing a low flow rate of a gas into the reactor. A flow of a fluid is introduced into the upstream inlet 131 of the reactor 300. A low flow rate of a gas is considered to have a mass flow rate less than approximately $\frac{1}{100}$ of the mass flow rate of the bulk liquid flow into the reactor from inlet 131. In some embodiments the mass flow rate of gas is approximately $\frac{1}{1000}$ the mass flow rate of fluid into the reactor.

Figure 5:
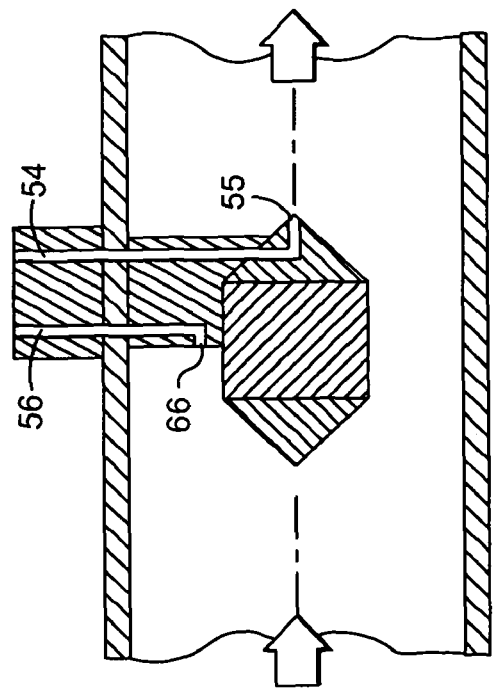
FIG. 5 is another diagram similar to FIG. 4 showing alternative apertures and channels for enabling mass flow measurement.
Figure 4:
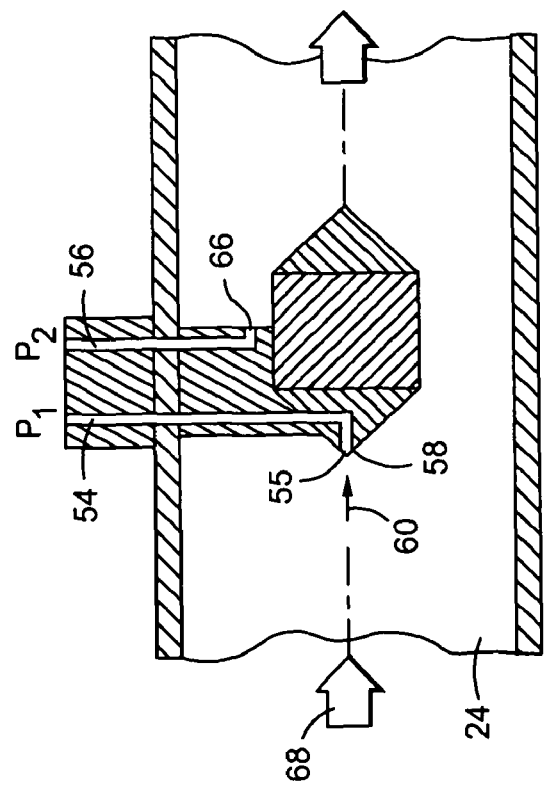
FIG. 4 is a schematic partial transverse cross sectional diagram showing apertures and channels included in the cone-pi element for enabling mass flow measurement in accordance with the present invention.

In various embodiments, a cone-pi reactor is capable of effectuating measurement of the mass flow rate of the bulk fluid flow admitted through an inlet 131 shown with respect to FIGS. 1 and 3. Mass flow can be measured in the manner disclosed by U.S. Pat. Nos. 7,404,337 and/or 6,865,957 assigned to Fluid Energy Conversion, Inc. which are hereby incorporated by reference for all purposes. In these various embodiments the reactor has at least one channel such as 54 with respect to FIG. 4 and/or FIG. 5 in communication with a first aperture 55 at an apex of an upstream or downstream cone. Furthermore, in these various embodiments, the reactor has a second channel such as 56 in FIG. 4 and/or FIG. 5 in communication with a second aperture 66 approximately centered with respect to the cylindrical portion of the cone-pi element. Where the first aperture 55 is in an upstream apex facing the flow (shown in FIG. 4), the second aperture 66 is configured in a downstream facing position (e.g. faces away from the direction of flow). Conversely, where the first aperture 55 faces downstream of the flow direction as shown in FIG. 5, the second aperture 66 is configured in an upstream facing position (e.g. faces the flow as shown in FIG. 5). In some embodiments, as shown with respect to FIGS. 4 and 5, passages through a single strut supporting the cone-pi element also provide the flow channels. These flow channels and their associated apertures can be used for sensing pressures at an apex of the cone-pi element and/or in an upstream or downstream facing direction in the flow stream approximately centered over the cone-pi element 145.

The present invention enables the provision of a family of carefully constructed cone-pi assemblies to accommodate any mass flow rate of fluid desired in an appropriate flow containment, The assembly generates a family of stable vortex energy fields, absent either normal turbulence, or other boundary layer separation problems or Reynolds's number normal regime change effects.

This assembly generates a myriad (thousands) of stable vortices which in turn generate an ultrasonic energy field whose frequency commences in the range of human hearing and proceeds to the supersonic and ultrasonic ranges.

It is believed to always be driven by the absolute square of the mass flow rate, not just proportional to mass flow.

The energy thus transformed is from a combination of the mass flow momentum and the internal molecular energies; this process is basically a molecular energy exchange process.

The present invention uses the injection of minuscule amounts of a lighter molecule (including air or any gas, or a lighter density liquid) which in turn generates a unique, controlled cavitation energy field. The amount of air injected is only $1/100$ to $1/1000$ of the mass flow through the reactor. The cavitation energy thus can be controlled up or down to any desired intensity.

A by product is the creation of powerful shock waves from the continuous build up and collapse of cavitation cells which adds a powerful component to the ultrasonic energy field.

The reactor rings resonate the ultrasound and shockwave energies, the effect of which has been photographically captured using stroboscopic photography.

The Cone Pie Assembly and the containment create a pure ultra sonic field in the range of human hearing on up to supersonic; the intensity is driven by the square of the mass flow rate. When lighter gases or liquids are added, they create a super cavitating uniform field made up of tiny spheroids. These spheroids are cavitation cells that build and collapse and when they collapse they create shock waves that add to the ultrasonic field. When these shock waves encounter the reactor rings they are amplified by resonating against the rings.

In addition, one can use an adjunct device; namely, a magnetic-ionize resonant generator 400 (FIG. 3) inductively or capactively coupled to the reactor rings to impart electromagnetic energy to the flow field energy and a pulsed electron shower to any fluid flowing through the reactor rings to energize any catalyst plated on these rings, and when necessary, to also destroy any pathogens in the fluids being processed by the reactor.

In the foregoing specification, various aspects have been described with reference to specific embodiments, but those skilled in the art will recognize that further aspects of the invention are not limited thereto. Various features and aspects-described above may be used individually or jointly. Furthermore, various aspects can be utilized in any number of environments and applications beyond those described herein without departing from the broader spirit and scope of the description. The written description and accompanying drawings are, accordingly, to be regarded as illustrative rather than restrictive.

The invention has been described herein in terms of several preferred embodiments. Other aspects of the invention, including alternatives, modifications, permutations and equivalents of the embodiments described herein, will be apparent to those skilled in the art from consideration of the specification, study of the drawings, and practice of the invention. The embodiments and preferred features described above should be considered exemplary, with the invention being defined by the appended claims, which therefore include all such alternatives, modifications, permutations and equivalents as fall within the true spirit and scope of the present invention.

What is claimed is:

1. A fluid reactor for facilitating mixing and/or chemical reaction comprising:
   an elongated cylindrical flow chamber having a first flow inlet at one end, and a flow outlet at another end, the first flow inlet being operable to admit a flow of a first fluid into the flow chamber,
   a second flow inlet through a wall of the flow chamber at a position downstream of the first flow inlet, the second flow inlet being operable to admit a relatively low mass flow of a second fluid into the flow chamber; and
   a cone-pi element disposed in a position, centered within the chamber, downstream of the second flow inlet and having an upstream conical portion with a leading apex generally facing the first flow inlet, an intervening cylindrical portion, having a uniform diameter and a downstream conical portion with a trailing apex generally facing the flow outlet, the cone-pi element being attached to a wall of the flow chamber by at least one strut, the cone-pi element being operable to cause the entire fluid flow to move over the upstream conical portion, none of said fluid flow entering the cone-pi element, to produce cavitation and/or vortical flow within the flow stream to effectuate mixing and/or chemical interaction of the first fluid and the second fluid, and to deliver a mixed and/or reacted fluid from the flow outlet.

2. A fluid reactor as recited in claim 1 and further comprising:
   a catalytic component disposed within said chamber between said cone-pi element and said flow outlet for further influencing the interaction between said first fluid and said second fluid prior to its exit through said flow outlet.

3. A fluid reactor for facilitating mixing and/or chemical reaction comprising:
   an elongated cylindrical flow chamber having a first flow inlet at one end, and a flow outlet at another end, the first flow inlet being operable to admit a flow of a first fluid into the flow chamber;
   a cone-pi element disposed in a position, centered within the chamber, downstream of the first flow inlet and having an upstream conical portion with a leading apex generally facing the first flow inlet, an intervening cylindrical portion, having a uniform diameter cooperating with the wall of said chamber to provide a fluid passageway around said cone-pi element, and a downstream conical portion with a trailing apex generally facing the flow outlet, the cone-pi element being attached to a wall of the flow chamber by at least one strut; and
   a conduit extending from a point external to said chamber through said strut to at least one port forming a second flow inlet in said upstream conical portion of said cone-pi element for admitting a relatively low mass flow of a second fluid into the flow chamber to mix and/or interact with said first fluid,
   said cone-pi element being operable to cause the entire fluid flow to move over the upstream conical portion, none of said fluid flow entering the cone-pi element, to produce cavitation and/or vortical flow within the flow stream through said chamber to effectuate mixing and/or chemical interaction of the first fluid and the second fluid, and to deliver a mixed and/or reacted fluid from the flow outlet.

4. A fluid reactor as recited in claim 3 and further comprising:
a catalytic component disposed within said chamber between said cone-pi element and said flow outlet for further influencing the interaction between said first fluid and said second fluid prior exit of the fluids through said flow outlet.

5. A fluid reactor as recited in claim 3 and further comprising:
a third flow inlet through a wall of the flow chamber at a position upstream of said cone-pi element, the third flow inlet being operable to admit a relatively low mass flow of a third fluid into the flow chamber for mixing and/or reacting with said first and second fluids.

6. A fluid reactor as recited in claim 5 and further comprising:
a catalytic component disposed within said chamber between said cone-pi element and said flow outlet for further influencing the interaction between said first fluid, said second fluid and said third fluid prior to exit of the fluids through said flow outlet.

7. The fluid reactor of claim 1 wherein the second flow inlet through a wall of the flow chamber is at a position upstream of the cone-pi element.

8. The fluid reactor of claim 1 in which the second fluid is a gas.

9. The fluid reactor of claim 8 in which the gas has a low mass flow rate, less than about $1/100$ of the mass flow rate of the bulk liquid flow.

10. The fluid reactor of claim 1 comprising a plurality of struts in which one or more of the struts comprise fluid channels in fluidic communication with a passage connecting through the cone-pi element to the apex of the upstream conical portion.

11. The fluid reactor of claim 10 in which one or more of the fluid channels can be selectively throttled using flow control means.

12. The fluid reactor of claim 3 in which the annular passage around said cone-pi element is at least 25% of the inside diameter of the elongated cylindrical flow chamber's inside diameter.

13. The fluid reactor of claim 2, 4 or 6 further comprising a magnetic-ionize resonant generator, coupled to the catalytic component to energize the catalytic component.

14. The fluid reactor of claim 1 or 3 in which the interior of the cone-pi element is solid.

15. The fluid reactor of claim 1 or 3 in which the interior of the cone-pi element is at least partially hollow.

16. A fluid reactor for facilitating mixing and/or chemical reaction comprising:
an elongated cylindrical flow chamber having a first flow inlet at one end, and a flow outlet at another end, the first flow inlet being operable to admit a flow of a first fluid into the flow chamber, a second flow inlet through a wall of the flow chamber at a position downstream of the first flow inlet, the second flow inlet being operable to admit a relatively low mass flow of a second fluid into the flow chamber; and a substantially solid cone-pi element disposed in a position downstream of the second flow inlet and having an upstream conical portion with a leading apex generally facing the first flow inlet, an intervening cylindrical portion, having a uniform diameter and a downstream conical portion with a trailing apex generally facing the flow outlet, the cone-pi element being attached to a wall of the flow chamber by at least one strut, the cone-pi element producing vortex energy, ultrasonic energy, cavitation energy, and shock wave energy causing efficient molecular mixing or chemical reactions of the fluids to deliver a mixed and/or reacted fluid from the flow outlet.

17. The fluid reactor of claim 1, 3 or 16 in which the second fluid is a liquid, a gas, an emulsion or a slurry of microscopic particles.

18. The fluid reactor of claim 1, 3 or 16 in which the fluid flow over the cone-pi creates uniform vortices which are established just past the upstream conical portion and which emit an ultrasound frequency proportional to the mass flow, the second fluid having a different density than the first fluid, the interaction of the first fluid and the second fluid with the ultrasound causing cavitation of the second fluid which releases shock wave energy, the combination of converting flow energy into vortex energy, ultrasonic energy, cavitation energy, and shock wave energy causing efficient molecular mixing or chemical reactions.

19. The fluid reactors of claim 18 in which the second fluid is a gas.

* * * * *